(12) United States Patent
Pratapa et al.

(10) Patent No.: US 11,182,532 B2
(45) Date of Patent: Nov. 23, 2021

(54) HIERARCHICAL DENSITY UNIFORMIZATION FOR SEMICONDUCTOR FEATURE SURFACE PLANARIZATION

(71) Applicant: Taiwan Semiconductor Manufacturing Co., Ltd., Hsinchu (TW)

(72) Inventors: Venkata Sripathi Sasanka Pratapa, Hsinchu (TW); Jyun-Hong Chen, Taichung (TW); Wen-Hao Cheng, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 16/806,196

(22) Filed: Mar. 2, 2020

(65) Prior Publication Data

US 2021/0019465 A1    Jan. 21, 2021

Related U.S. Application Data

(60) Provisional application No. 62/874,454, filed on Jul. 15, 2019.

(51) Int. Cl.
| | |
|---|---|
| *G06F 30/30* | (2020.01) |
| *H01L 23/00* | (2006.01) |
| *G06F 30/398* | (2020.01) |
| *G06F 30/392* | (2020.01) |
| *G06F 111/10* | (2020.01) |
| *G06F 113/18* | (2020.01) |

(52) U.S. Cl.
CPC .......... *G06F 30/398* (2020.01); *G06F 30/392* (2020.01); *H01L 24/14* (2013.01); *G06F 2111/10* (2020.01); *G06F 2113/18* (2020.01)

(58) Field of Classification Search
None
See application file for complete search history.

(56) References Cited

U.S. PATENT DOCUMENTS 5,552,996 A * 9/1996 Hoffman ............... B24B 37/042
700/121
5,923,563 A * 7/1999 Lavin .................... G06F 30/398
716/54

(Continued)

OTHER PUBLICATIONS

C. C. Liu et al., "Micro Bump Height Derivation Control With Dynamic Sizing Patterning," 2018 29th Annual SEMI Advanced Semiconductor Manufacturing Conference (ASMC), pp. 103-105. (Year: 2018).*

(Continued)

*Primary Examiner* — Leigh M Garbowski
(74) *Attorney, Agent, or Firm* — Seed IP Law Group LLP

(57) ABSTRACT

The current disclosure describes techniques for managing planarization of features formed on a semiconductor wafer. The disclosed techniques achieve relative planarization of micro bump structures formed on a wafer surface by adjusting the pattern density of the micro bumps formed within various regions on the wafer surface. The surface area size of a micro bump formed within a given wafer surface region may be enlarged or reduced to change the pattern density. A dummy micro bump may be inserted into a given wafer surface region to increase the pattern density.

19 Claims, 8 Drawing Sheets

(56) References Cited

U.S. PATENT DOCUMENTS

| | | | |
|---|---|---|---|
| 8,001,516 B2* | 8/2011 | Smith | G06F 30/39 |
| | | | 716/136 |
| 8,286,111 B2* | 10/2012 | Chandra | G06F 30/367 |
| | | | 716/110 |
| 8,627,243 B1* | 1/2014 | Lin | H01L 21/7684 |
| | | | 716/54 |
| 9,905,527 B1* | 2/2018 | Hacker | H01L 24/17 |
| 2020/0105654 A1* | 4/2020 | Li | H01L 24/14 |

OTHER PUBLICATIONS

C. C. Liu et al., "Comprehensive Solution for Micro Bump Coplanarity Control," 2019 IEEE 69th Electronic Components and Technology Conference (ECTE), pp. 1693-1696. (Year: 2019).*

* cited by examiner

HIERARCHICAL DENSITY UNIFORMIZATION FOR SEMICONDUCTOR FEATURE SURFACE PLANARIZATION

BACKGROUND

In flip chip techniques, metal pads are formed on an upper surface of an integrated circuit ("IC") wafer with respect to the ICs formed on the wafer. Solder bumps or copper bumps are deposited on the metal pads. The ICs are then severed from the wafer into IC dies. The severed IC dies are flipped and positioned on a carrier substrate such that the solder bumps face the connectors on the carrier substrate. Solder bumps are then re-melted, e.g., using thermosonic bonding or alternatively reflow solder process, such that the ICs are securely coupled to the carrier substrate. Electrical connections are formed between the melted solder bumps and the connectors. The small space between the IC die and the underlying carrier substrate is underfilled with an electrically-insulating adhesive.

A fan-out wafer-level package ("WLP") may be used to pack one die, multiple dies side-by-side or multiple dies in a package-on-package ("POP") vertical configuration. The POP configuration in fan-out WLP is achieved through interconnection features, such as a via, that connect multiple dies vertically.

In fan-out WLPs, tested-good dies are positioned onto a carrier wafer. Layers of interconnection features are formed connecting the die to the associated I/O pads and among the various layers of interconnections themselves. The interconnections are formed through wafer level processes, where photoresist and photolithography processes are used similarly as in the front-end wafer fabrication processes. Therefore, vertical alignments between or among sequential layers of the interconnections need to be managed.

CoWoS is a wafer-level multi-chip packaging technology that incorporates multiple IC blocks or chiplets side-by-side on a silicon interposer in order to achieve better interconnect density and performance. The chiplets are bonded through micro-bumps on a silicon interposer forming a chip-on-wafer (CoW). The CoW is then subsequently thinned such that the TSV perforations are exposed. Cu bumps are formed on the other side of the silicon interposer. The silicon interposer is then singulated to obtain IC dies. A CoWoS package is completed through bonding an IC die to a package substrate.

The flip chip techniques, fan-out WLP techniques, or the CoWoS techniques, or similar techniques that involve coupling metal bumps/balls to a carrier substrate with connectors generally require very flat mounting surfaces on the side of the metal bumps/balls and the on the side of the carrier substrate. Planarization on the metal bump/ball side is difficult to arrange or to maintain. Uneven heights on the metal bumps/balls may cause cold joints, i.e., the metal bump/ball being separated from the connectors on the carrier substrate.

BRIEF DESCRIPTION OF THE DRAWINGS

Aspects of the present disclosure are best understood from the following detailed description when read with the accompanying figures. In the drawings, identical reference numbers identify similar elements or acts unless the context indicates otherwise. The sizes and relative positions of elements in the drawings are not necessarily drawn to scale. In fact, the dimensions of the various features may be arbitrarily increased or reduced for clarity of discussion.

DETAILED DESCRIPTION

Figure 1:
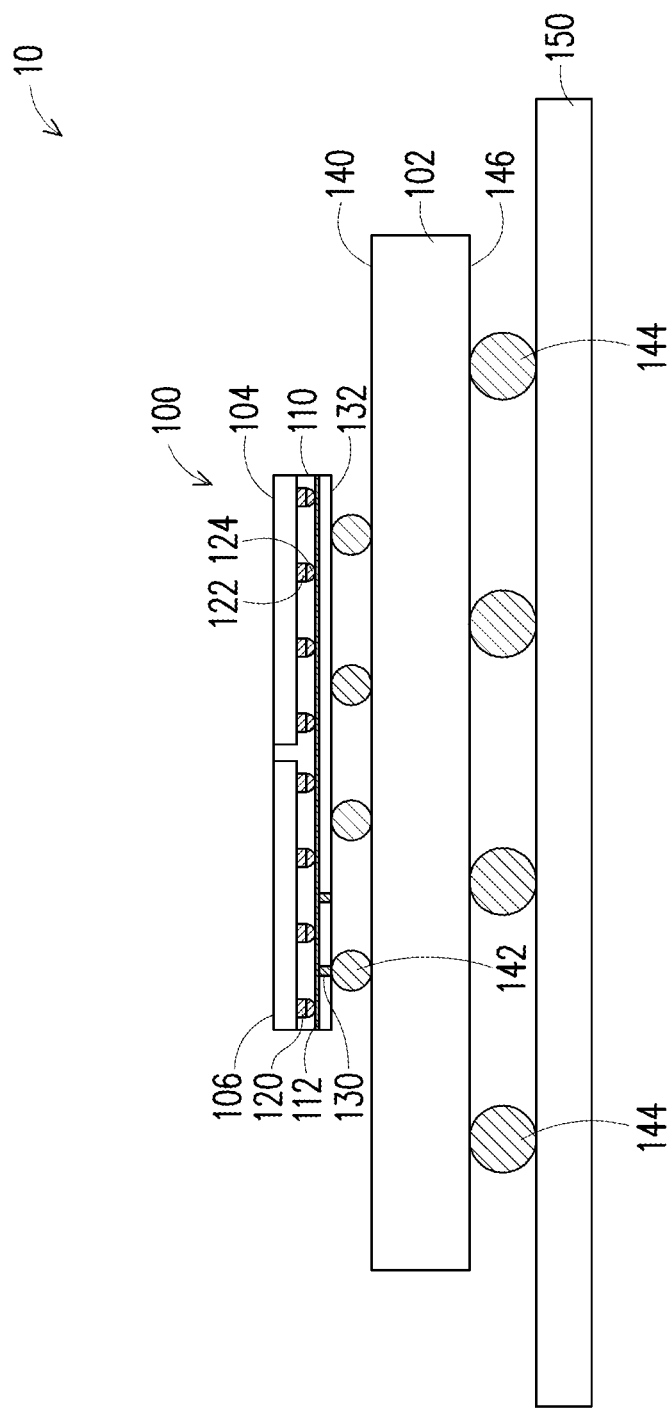
FIG. 1 is an example wafer level package.

The current disclosure describes techniques for managing planarization of features formed on a semiconductor wafer. Inventors of the disclosed techniques observed a correlation between a density of micro bump structures formed within a given surface sampling region, referred to as "pattern density," and a height of the formed micro bumps in the given surface region. A pattern density refers to a ratio between a total surface area of the micro bumps formed in a surface region and a surface area of the surface sampling region. The disclosed techniques achieve relative planarization of micro bump structures formed on a wafer surface by adjusting the pattern density of the micro bumps formed within various regions on the wafer surface. The pattern density is adjusted by various ways. For example, the surface area size of a micro bump formed within a given wafer surface region may be enlarged or reduced to change the pattern density. In another example, a dummy micro bump may be inserted into a given wafer surface region to increase the pattern density.

The pattern density information of a sampling region is initially obtained from physical layout design information of the micro bumps on a wafer surface. In a specific sampling, the layout is partitioned into a plurality of sampling regions of a certain size. The pattern density information is obtained for each sampling region.

After the pattern density information is obtained for each sampling region, a pattern density planning operation is conducted to adjust or "plan" the pattern density in each sampling region. The planning includes a local correction operation and a global correction operation. The local correction operation includes a local convolution operation to smooth or "blur" the pattern density information of a sampling region based on the pattern density information of neighboring sampling regions. In an embodiment, the smoothing operation is implemented through a Gaussian filter and a gradient aware correction kernel. The neighboring sampling regions may be selected using various criteria. In an embodiment, a 3×3 pooling criterion is used where a target sampling region and eight surrounding sampling regions form a 3×3 pool patch. The pattern density of the target sampling region is smoothed based on the pattern density of the eight surrounding sampling regions under the Gaussian smoothing. The pool patch may also be defined as 4×4, 5×5, 6×6 or other pool patch sizes.

The local convolution operation may be performed at different sampling sizes following a down-sampling path, where the size of a sampling region increases sequentially. A pattern density of a larger sampling region is initially obtained through mean pooling of the smoothed/corrected pattern density of the smaller sized sampling regions that are contained in the larger sampling region. After the initial pattern density information of each of the larger sampling regions is obtained, a local convolution operation is conducted to smooth the obtained initial pattern density.

The global correction follows an up-sampling path, where the sampling region size decreases sequentially. Through the up-sampling path, or the global corrections, the smoothed pattern density information of a larger sampling region is incorporated in correcting a feature density of a smaller sampling region.

For the local or global corrections, a lower density bound and an upper density bound are used to constraint the adjustment of the pattern density. When the desired pattern density corrections for a sampling region are beyond the lower density bound or the upper density bound, a dummy micro bump feature may be added to the sampling region or other sampling regions to affect the pattern density in the sampling region or the other sampling regions.

After the pattern density of the micro bumps are corrected or planned for the whole wafer, such corrected pattern density information is used to update the layout design of the micro bumps on the wafer. The micro bumps are formed on the wafer based on the updated layout design.

FIG. 1 is an example CoWoS package 10. The package 10 includes a die 100 and a package substrate 102. The die 100 includes chiplets 106, 104 that are positioned side-by-side on a silicon interposer 110, forming a chip-on-wafer (CoW) die. The silicon interposer 110 includes a metal redistribution layer ("RDL") 112 that includes multiple metal layers facing the chiplets 106, 104. In an embodiment, the metal RDL 112 includes three copper damascene layers and one aluminum layer. The chiplets 106, 104 are each connected to the metal RDL 112 through a plurality of micro bumps 120. In some embodiment, the micro bumps 120 includes two parts 122, 124. Parts 122 are formed on surfaces of the chiplets 106, 104. Parts 124 are formed on the surface of the RDL 112. The parts 122, 124 are coupled together through, e.g., a re-flow process, to form the micro bumps 120. In some embodiment, each of the parts 122, 124 may include a chip connection ("C2") bump, e.g., of a copper Cu pillar and a solder cap over the Cu pillar. In an embodiment, the micro bump 120 includes only one of the parts 122 or the parts 124. The silicon interposer 110 includes through silicon vias ("TSV") 130 to connect the RDL 112 to connection features on a bottom surface 132 of the silicon interposer 110, e.g., the C4 bumps 142.

The die 100 is connected to an upper surface 140 of the package substrate 102 through controlled collapsed chip connection "C4" bumps 142. The C4 bumps are formed on the bottom surface 132 of the silicon interposer as a sequence of under bump metallurgy, resist overlay, and solder bump mask.

Solder balls 144 are formed on a bottom surface 146 of the package substrate 102. The CoWoS package 10 is connected to a printed-circuit-board ("PCB") 150 through the solder balls 144.

Figure 2A:
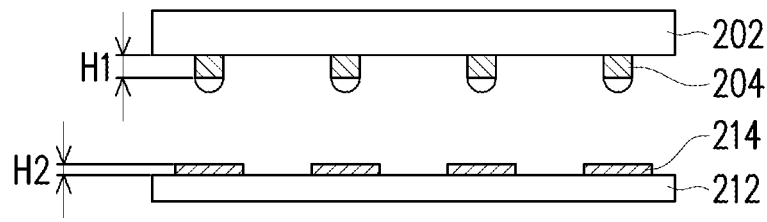
FIGS. 2A-2C show example scenarios of two wafers coupled together.
Figure 2B:
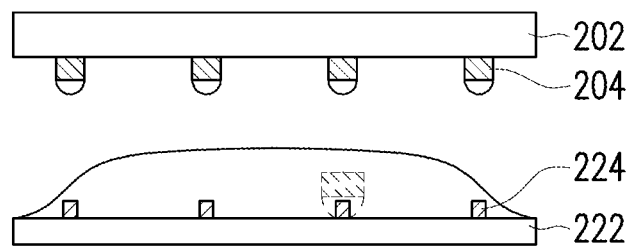
Figure 2C:
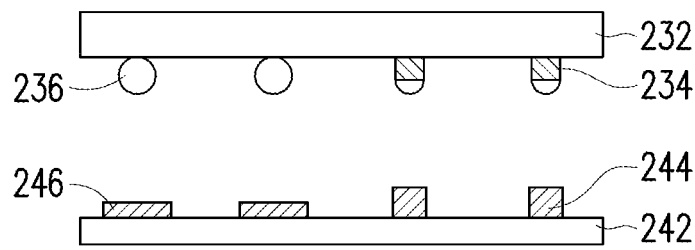

In FIG. 1, for simplicity and illustrative purposes, the connection bumps, balls 120, 142, 144 are illustrated as coupling to a flat surface, which does not limit the scope of the disclosure. FIGS. 2A-2C show that a first wafer 202, 232 with connection bumps/balls 204, 234 may be coupled to a second wafer 212, 222, 242 with various corresponding connection structures 214, 224, 244. For example, FIG. 2A shows that the second wafer 212 includes connection pad features 214 to connect to the connection bumps/balls 204 of the first wafer 202. The connection pad 214 may include a larger interface surface than the connection bump/ball 204. FIG. 2B shows that the second wafer 222 includes connection lead features 224 to connect to the connection bumps/ balls 204 of the first wafer 202. The connection pad 214 may include a smaller interface surface than the connection bump/ball 204, and may be embedded within the solder material of the connection bumps/balls 204 (illustratively shown with dotted lines) when the first wafer 202 and the second wafer 222 are coupled together. FIG. 2C shows that the first wafer 232 includes different types connection pad features 234, 236 on a same surface to connect to corresponding connection structures 246, 244 on the second wafer 242. In all of the examples of FIGS. 2A-2C, the height H1 (shown only on FIG. 2A) of the connection bumps/balls 204, 234, 236 on the first wafer 204, 232 coordinate with the height H2 (shown only on FIG. 2A) of the connection structures 214, 224, 244, 246 on the second wafer 212, 222, 242 to perfect the connections between the first wafer 202, 232 to the corresponding second wafer 212, 222, 242. The imperfections on the height H1 or the height H2 may cause cold-joint problem, where the relevant connection bumps 204, 234, 236 do not properly touch or couple with the corresponding connection structures 214, 224, 244, 246.

In many application scenarios, a perfect height H1 means that all the connection bumps/ball 204, 234, 236 on a respective first wafer 202, 232 are substantially at a same level. A perfect height H2 means that all the connection structures 214, 224, 244, 246 on a respective second wafer 212, 222, 242 are substantially at a same level. However, the disclosure is not limited by this example. In other examples, the height H1 and the corresponding height H2 are considered together in the connection bump/ball planarization design and the connection bumps/balls 204, 234, 236 on a same first wafer 204 may have different height H1, especially when the corresponding connection structures 214, 224, 244, 246 on a corresponding second wafer 212, 222, 242 include different height H2. The techniques described here may be used to design and form connection bumps/ balls on the first wafer and/or the connection structures on the second wafer with desirable heights H1, H2.

Figure 3:
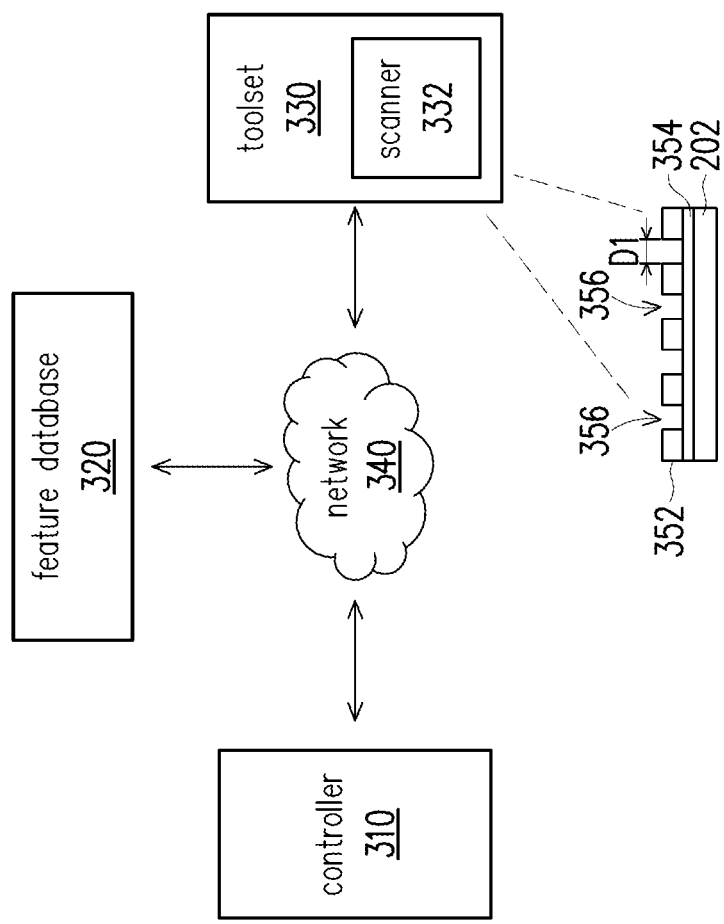
FIG. 3 is an example system.

FIG. 3 is an example feature fabrication system 300. The control system 300 includes a fabrication controller 310, a feature database 320 and a fabrication toolset 330. The fabrication toolset 330 includes various tools for various processes in forming a feature on a wafer. For example, for forming a micro bump on a wafer surface, the toolset 330 may include tools for implementing seed layer sputtering, photoresist patterning, electroplating, photoresist removal, seed layer itching, connection bump reflow, flux cleaning, etc. One or more of the tools may be controlled by the fabrication controller in the process of forming the micro bumps. For example, the controller 310 may control a scanner machine 332 to pattern a photoresist layer 352 formed over a seed layer 354 on a wafer 202 such that the seed layer is exposed in a desired way to form micro bumps thereon. For example, in an embodiment, the controller 310 may control the scanner to form the apertures 356 of controlled lateral surface size DI in the photoresist layer 352 to expose the underlying seed layer 354. The controlled sizes DI of the apertures 356 correlate to heights of the conductive structures (not shown for simplicity), e.g., micro bumps, formed in the apertures 356. As such, by controlling the sizes DI of the apertures 356 formed in the photoresist layer 352, the controller 310 controls the heights of the micro bumps. In another example, the controller 310 may also control the number and/or locations of the apertures 356 formed on the photoresist layer such that the number and locations of the micro bumps are controlled.

The feature database 320 may store data on layers of features formed on a semiconductor wafer. For example, the feature database 320 may store data of integrated circuit layouts of layers formed in front-end-of-line ("FEOL"), middle-of-line ("MOL"), back-end-of-line ("BEOL") fabrication processes, layouts of features formed in a packaging process, e.g., C4 bump formation, and/or layout of feature formed in preparing a wafer/die for a packaging process, e.g., formation of TSV or micro bumps. In an embodiment, the data in the feature database 320 is in format of a graphic database system ("GDS"), e.g., GDSII, OASIS or OASIS.MASK. The feature database 320 may include feature layout data in multiple different formats for different layers formed on a wafer. In addition, the controller 310 may function with multiple different feature database 320 for different layers in different semiconductor fabrication processes. For example, layout data created in the OASIS.MASK format may be specifically used with respect to the control of a photoresist formation.

The controller 310, the feature database 320 and the toolset 330 may be electrically or communicatively coupled to one another through a network 340. The network 340 may be any wired or wireless networks like internet, intranet, cellular, short-range wireless communication, near field communications and other suitable networks. Each of the controller 310 and the feature database 320 may be implemented by one or more physical computing machine or by one or more virtual machine. The functions of the controller 310 or the feature database 320 may be implemented by a single physical or virtual computing device or by multiple physical or virtual devices in a distributed computing environment.

Figure 4:
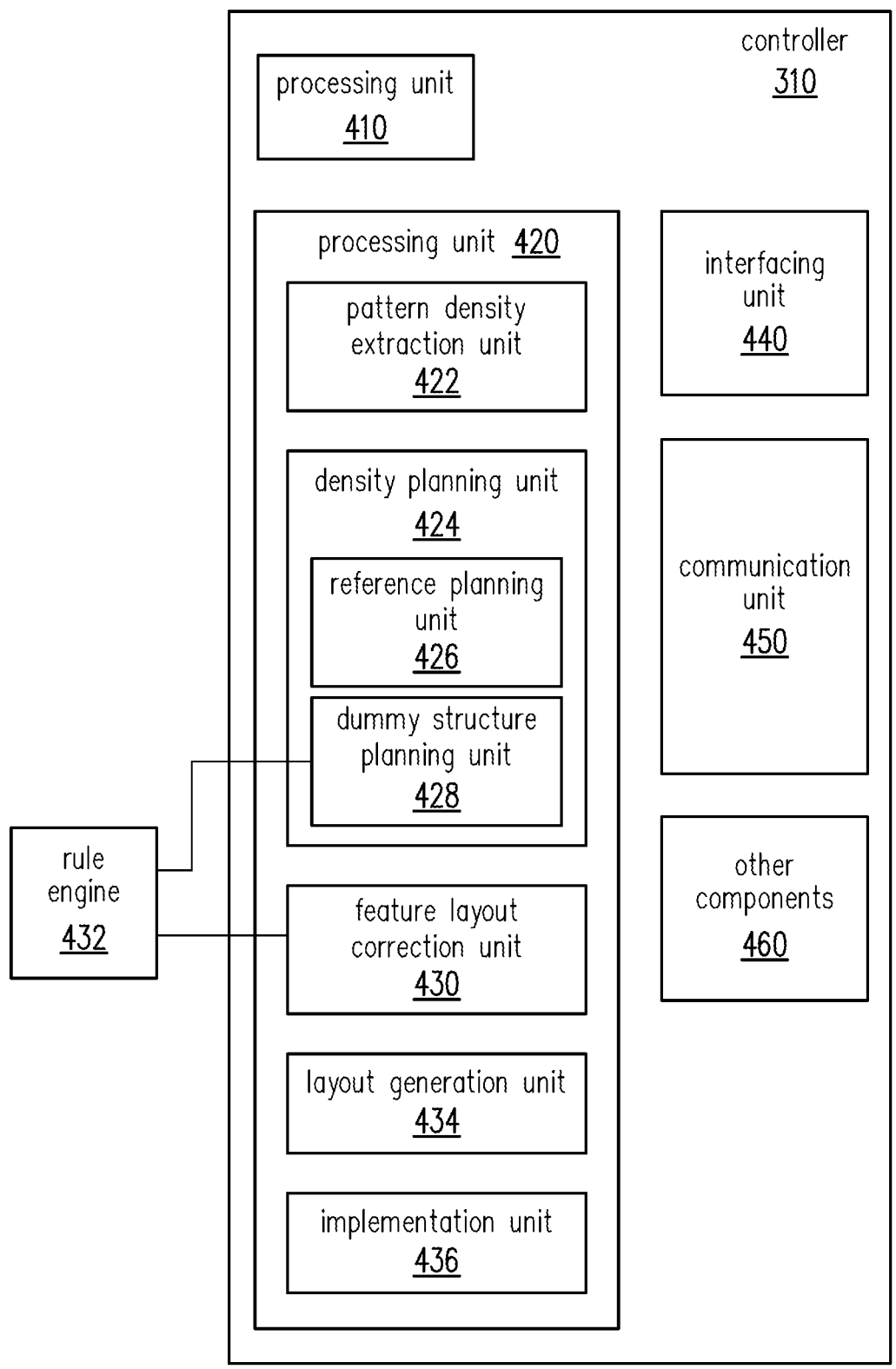
FIG. 4 is an example controller.

FIG. 4 shows details of an example controller 310. Referring to FIG. 4, the controller 310 includes a processing unit 410 and a storage unit 420. In an embodiment, the processing unit 410 may be an application-specific instruction set processor (ASIP) that is specifically configured and contains specific instruction sets for controlling the semiconductor wafer fabrication processes. For example, the instruction set of the processing unit 410 is tailored to benefit an efficient and fast processing of instruction on the specific application of controlling wafer fabrication processes. The processing unit 410 may also include configurable instruction sets such that the processing units 410 may function with different feature database for controlling different fabrication processes or different semiconductor products of different layout of layers. For example, the processing unit 410 may include multiple cores dedicated for different static logics and/or configurable logics.

The storage unit 420 may be a system memory storing, among others, application specific instructions dedicated for the functions and/or applications that each implements. For example, the application specific instructions are dedicated as separate modules to implement a pattern extraction unit 422, a density planning unit 424, a feature layout correction unit 430, a layout generation unit 434 and an implementation unit 436. The density planning unit 424 may include a reference planning unit 426 and a dummy structure planning unit 428. The feature layout correction unit 430 may include or may function with a rule engine 432.

The controller 310 may also include an interfacing unit 440, a communication unit 450 and other components 460. The interfacing unit 440 may include any human-machine interfacing devices and related components that enable operator inputs to be received by the controller 310. The communication unit 450 may include any machine-to-machine communication devices, e.g., an RF component or a wired data port, that enable the controller 310 to communicate with the feature database 320 and/or the toolset 330.

The pattern extraction unit 422, density planning unit 424, feature layout correction unit 430, layout generation unit 434 and implementation unit 436 each includes dedicated computer executable instructions. Those instructions, when executed by the processing unit 410, configure the processing unit 410 to implement the functions of each of the pattern extraction unit 422, density planning unit 424, feature layout correction unit 430, layout generation unit 434 and implementation unit 436.

The controller 310 and the components thereof may reside in a single computing device or may reside in a plurality of computing devices that function together in a distributed computing environment. For example, the processing units and the pattern extraction unit 422, the density planning unit 424, the feature layout correction unit 430, the layout generation unit 434 and the implementation unit 436 may reside in different computing devices and may function together to achieve a virtual controller 310. A virtual controller 310 may include virtualization on multiple layers, like application layer virtual machine and virtual storage.

Figure 5:
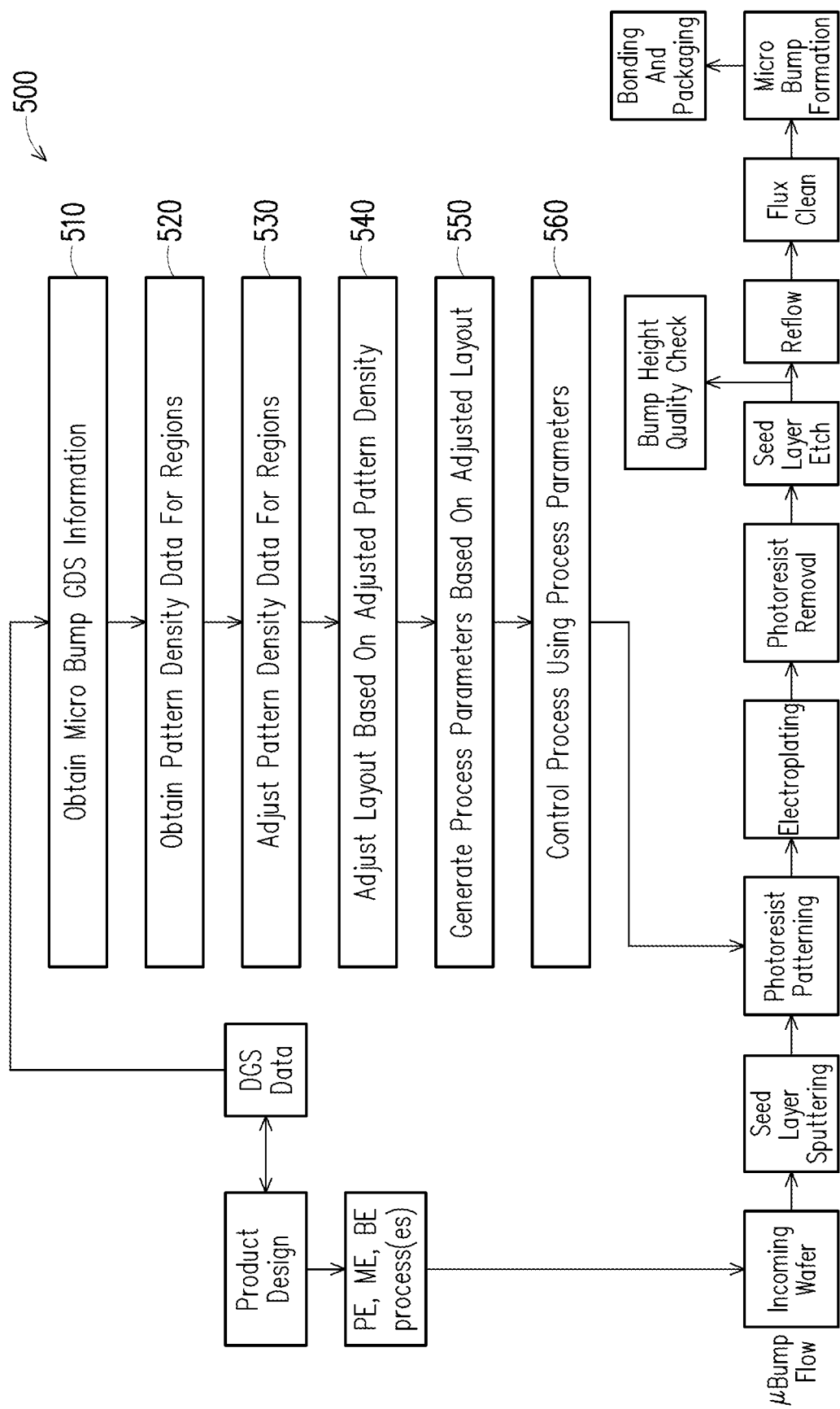
FIG. 5 is an example operation process of the controller.

FIG. 5 illustrates an operation 500 of the controller 310. In FIG. 5, an example micro bump "µBump" formation process is used to illustrate the operation of the controller 310. It should be appreciated that the controller 310 and the components or functions thereof may be used to control formation of other layers or features on a wafer. For example, similar operations may be used to control the formation of other C2 bumps, C4 bumps or solder ball on a die, a carrier wafer, an interposer substrate, or even a PCB.

The example µBump formation process starts with receiving an incoming wafer that has completed the front-end fabrication processes including the FEOL, MOL, and the BEOL processes. On the received wafer, e.g., the wafer 202 of FIG. 3, a sequence of operation of seed layer sputtering, photoresist patterning, electroplating, photoresist removal, seed layer etch, reflow and flux clean to complete micro bump formation. After the micro bumps are formed, the wafer may be cut into dies to complete the packaging process.

The operation 500 may be used to control the photoresist patterning process which determines the size and locations of the micro-bumps formed over the seed layer.

In example operation 510, the controller 310 obtains the GDS data regarding the micro bumps from the feature database 320. The GDS data provides the layout design of the micro bumps based on the chip product design and fabrication process design applicable to the wafer.

In example operation 520, the pattern density extraction unit 422 obtains the pattern density of the micro bumps formed on various surface grid regions. For example, a target surface of the wafer 202 where the micro bumps are to be formed is segmented into a plurality of grid region, e.g., of substantially the same dimensions. The layout of the micro bumps is mapped into each of the grid regions to obtain the number, type and/or size of the micro bumps to be formed in each of the grid regions. The pattern densities of the micro bumps are obtained for each of the grid regions. In an embodiment, a pattern density of a grid region is evaluated based on a ratio between a total surface area of the micro bumps in the grid region and a surface area of the grid region. The surface area of a micro bump may be selected as an area of the top surface, an area of the bottom surface or an area of a cross-sectional plane between the top surface and the bottom surface of the micro bump or any combination or averaging thereof.

The below algorithm (1) may be used to calculate the pattern density:

$$\rho(x, y) = \frac{1}{w^2} \int\int_{-w/2}^{w/2} M(x, y)\, dxdy, \quad (1)$$

where w denotes a size of a grid region, ρ denotes pattern density, and M is a function of location (x,y). M takes either values 0 or 1, where value "0" indicates that there is no pattern, and value "1" indicates that there is a pattern at the location (x,y).

In an embodiment, for each grid region, the evaluation of the feature density value considers also the peripheral areas surrounding the grid region. The consideration of the peripheral area of a grid region helps to remove the arbitrary noise or inconsistency caused by the arbitrary partition of the target surface of the wafer 202 into the grid regions. For example, in an embodiment, a sub-pixel smoothing technique may be used in both the x-axis and the y-axis direction of a lateral X-Y plane of the target surface to enhance the pattern density evaluation of a target grid region by considering the peripheral area features. The below algorithm (2) may be used to effect the sub-pixel smoothing:

$$\rho_{final} = \frac{1}{4\epsilon^2} \int\int_{-\epsilon}^{\epsilon} \rho(x-\alpha, y-\beta)\, d\alpha d\beta, \quad (2)$$

where ε is a distance beyond the original grid region width in both the x and y directions and α and β are incremental changes in the x and y directions.

In example operation 530, the density planning unit 424 adjusts the pattern density of each grid region. In an example, the adjustment is determined based on the pattern density of neighboring grid regions. That is, the pattern density value of a given grid region is "smoothed" or "averaged" based on those of the neighboring grid regions. Any averaging or smoothing techniques may be used and all are included in the disclosure. In an embodiment, a Gaussian smoothing and a gradient aware correction kernel may be used to blur or smooth out the pattern density differences between a grid region and the neighboring grid regions. Mathematically, the Gaussian smoothing is implemented by convolving the pattern density value of a grid region with a Gaussian function. The gradient aware correction kernel is used with the Gaussian smoothing to reduce the differences in pattern density among the neighboring grid regions.

The pattern density smoothing based on neighboring grid regions may be conducted on multiple levels of partitioning or gridding the target surface. The pattern density smoothing operations on the different gridding levels may be conducted in a sequential manner. A pattern smoothing result obtained from a previous gridding level may be incorporated in the pattern smoothing operation for a later gridding level in the sequence. In a down-sampling path or sequence, the size of a grid region, "grid size", keeps increasing. In an up-sampling path or sequence, the grid size keeps decreasing.

In example operation 530, one or more of the down-sampling path or the up-sampling path may be used in implementing the pattern density smoothing. In a case that both the down-sampling path and the up-sampling path are used, a sequential order between the down-sampling path and the up-sampling path is selected. The selection may be based on a weight assigned to a global correction approach and a local correction approach. A down-sampling path is performed before an up-sampling path when it is determined that the correction or smoothing based on the pattern density information of local neighboring regions ("local corrections") are more important than the correction or smoothing based on the pattern density information of a larger portion of the wafer ("global correction"). On the other hand, an up-sampling path is performed before a down-sampling path when it is determined that the global correction is more important than the local correction. Whether the global correction or the local correction is more important may be determined based on product or process designs of specific integrated circuit or other semiconductor products, which are all included in the scope of the disclosure.

In some examples, the dummy structure planning unit 428 may add a dummy bump into a region or remove a dummy bump from a region in the density planning. A dummy bump is a structure made from similar or identical materials and processes as a micro bump structure, while the dummy bump does not function for electrical connection purposes. For example, a dummy bump does not provide additional electrical connections between the first wafer 202 and the second wafer 212, 222 other than those provided by one or more existing micro bumps. Addition or removal of a dummy bump onto a region will increase or decrease the pattern density thereof. In an embodiment, the size, e.g., the surface size of the dummy bump may be different from that of a micro bump in the same region. In some embodiments, the addition or removal of a dummy bump is conducted based on the pattern density value of the micro bumps as determined in the operation 520. For example, one or more dummy bumps may be added to a region if the pattern density value of the region is lower than an expected value for the region. One or more dummy bumps may be removed from a region if the pattern density value of the region is larger than an expected value for the region.

After a dummy bump is added or removed from a region, the pattern density smoothing operations may be conducted again to plan the pattern density.

In an embodiment, the pattern density planning or adjustment of the micro bumps 204 on the first wafer 202 may also be conducted based on the corresponding connection features 214, 224 of the second wafer 212, 222. For example, in a case that the connection features 214, 224 on the second wafer 212, 222 have uneven height H2, the corresponding micro bumps 204 on the first wafer 202 also have uneven height H1 such that each micro bump 204 can properly connect to a corresponding connection feature 214, 224. For example, a connection feature 214 of a larger height H2 matches with a micro bump 204 with a smaller height H1, while a connection feature 214 of a smaller height H2 matches with a micro bump 204 with a larger height H1. The reference planning unit 426 may obtain the height H2 information of the corresponding second wafer 212, 222 and determine the matching height H1 information based on the obtained height H2 information. The matching height H1 information, e.g., the height variations among micro bumps 204, may be used to adjust the pattern density of each grid region as the pattern density correlates with the heights of the micro bumps 202.

After the pattern density of each grid region is adjusted based on the operation of the reference planning unit 426, the pattern density smoothing operations may be conducted again to plan the pattern density. The example operations 520, 530 may be conducted iteratively until expected pattern density values are achieved for each and every regions or until other conditions for terminating the iteration are met.

For example, the iteration may be terminated when a total number of the rounds of iterations has reached a threshold value.

In example operation 540, the feature layout correction unit 430 may adjust the layout of the micro bumps 204 formed on the first wafer 202 based on the planned pattern density of the grid regions. The adjustment may include adjusting the surface size of each micro bump 202 in each grid region. Note that the pattern density of a grid region is determined as a ratio between the overall surface area of the micro bumps in the grid region and the surface area of the grid region. In some embodiments, the surface area of the micro bumps in a grid region is determined or adjusted based on the planned pattern density for the grid region. For example, a higher pattern density of a grid region generally indicates that the overall surface areas of the micro bumps in the grid region is larger. In a case where a grid region A and a grid region B has a same planned pattern density and the grid region A has less micro bumps than the grid region B, the surface area of the micro bumps in the grid region A will be larger than the surface area of the micro bumps in the grid region B. In a case that a grid region A and a grid region B has a same number of micro bumps and the grid region A has a larger pattern density as planned than the grid region B, the surface area of the micro bumps in the grid region A will be larger than the surface area of the micro bumps in the grid region B. Further, dummy bumps may be added or removed from a grid region in the pattern density planning and need to be implemented in the layout correction.

In some embodiment, the feature layout correction unit 430 may also adjust a location of a micro bump on the surface of the first wafer 202. The adjustment of the micro bump location may change the pattern density in the relevant grid region. The adjustment of the micro bump location may make the pattern density values of neighboring grid regions more consistent with one another such that the related heights of the micro bumps formed in the relevant grid regions are more consistent.

In an embodiment, the feature layout correction unit 430 may apply a rule in adjusting the layout. The rule(s) may provide restraints on the adjustments of the surface area or surface size of a micro bump. For example, a rule may provide that the surface area of a micro bump be no smaller than a threshold value such that proper connection to the corresponding connection features 214, 224 are ensured. A rule may also provide that a space between two adjacent micro bumps be no smaller than a threshold such that an undesired short circuit fault will be avoided. The feature layout correction unit 430 may retrieve rules from the rule engine 432.

In example operation 550, the layout generation unit 434 adjusts or generates the process parameters for achieving the corrected layout of the micro bumps 204 formed on the first wafer 202. The process parameters include any parameters that are related to the layout of the micro bumps 204. For example, in the example scenario of forming micro bump, the parameters of the photoresist patterning may be adjusted according to the surface area size of the micro bumps and the locations of the micro bumps 204 formed on the first wafer 202.

In example operation 560, the implementation unit 436 controls the toolset 330 in forming the micro bumps 204 based on the parameters generated by the layout generation unit 434. For example, the implementation unit 436 may control the operation of the scanner 332 in forming a patterned photoresist layer including apertures 356 to expose the seed layer 354 for forming the micro bumps 202. The sizes and locations of the apertures 356 are controlled by the layout parameters generated by the layout generation unit 434.

Following the formation of the patterned photoresist layer, micro bumps are formed based on patterned photoresist layer. For example, the micro bumps are formed in the apertures 356 of the patterned photoresist layer. FIG. 5 provides an illustrative example flow of forming the micro bumps, which does not limit the scope of the disclosure.

For example, fine-pitch electroplated solder bumps are formed on the seed layer exposed through the apertures of the patterned photoresist layer. Then the photoresist layer is removed. The wafer is then reflowed at a temperature above the solder's melting point to complete metallic interconnection of the micro bumps with underlying metal pads and to convert the micro bumps from deposited shape into a ball shape, which signs the completion of the formation of the micro bumps. After the micro bumps are formed, the wafer is cut into individual chips, which then go through subsequent packaging processes like the bonding procedures of FIGS. 2A-2C. Some example reflow procedures coat the wafer with a flux and then reflow the wafer in a nitrogen environment. Such flux-containing reflow procedure may include a flux cleaning operation because the decomposition of organic fluxes may leave residues and may generate volatiles, which are contaminants on the wafer. Some reflow procedures do not involve fluxes and there is no flux cleaning operation. Other procedures to form micro bumps based on the patterned photoresist layer are also possible and included within the scope of the disclosure.

Figure 6:
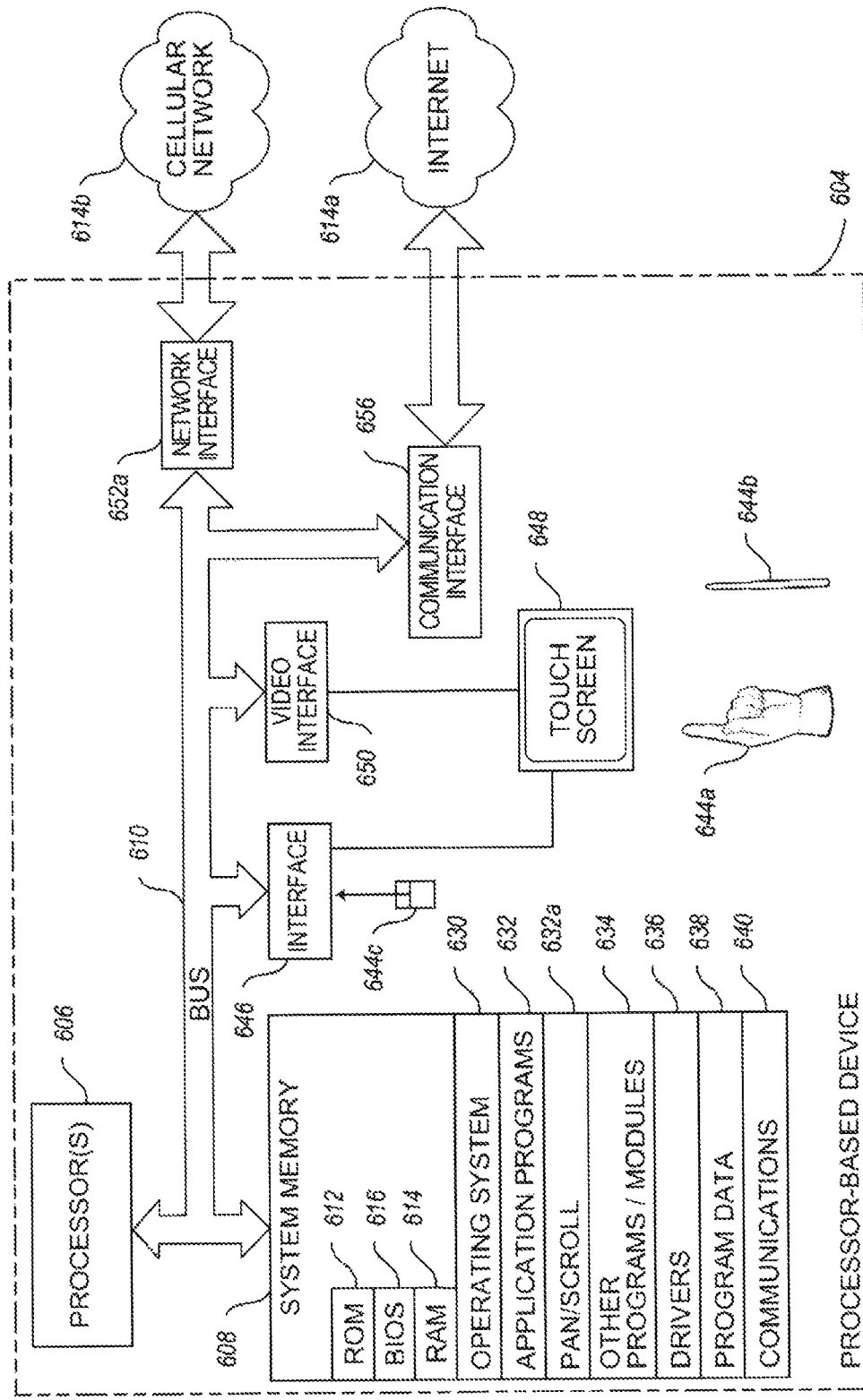
FIG. 6 is an example computer system for implementing the controller.

FIG. 6 shows a processor-based device 604 suitable for implementing various embodiments described herein. For example, the processor-based device 604 may be representative of the computing systems of client, platform, publisher and/or content provider. Although not required, some portion of the embodiments will be described in the general context of processor-executable instructions or logic, such as program application modules, objects, or macros being executed by one or more processors. Those skilled in the relevant art will appreciate that the described embodiments, as well as other embodiments, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

The processor-based device 604 may, for example, take the form of a smartphone or tablet computer, which includes one or more processors 606, a system memory 608 and a system bus 610 that couples various system components including the system memory 608 to the processor(s) 606. The processor-based device 604 will at times be referred to in the singular herein, but this is not intended to limit the embodiments to a single system, since in certain embodiments, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, and 68xxx series microprocessors from Motorola Corporation.

The processor(s) 606 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 6 are of conventional design. As a result, such blocks need not be described in further detail herein, as they will be understood by those skilled in the relevant art.

The system bus 610 can employ any known bus structures or architectures, including a memory bus with memory controller, a peripheral bus, and a local bus. The system memory 608 includes read-only memory ("ROM") 612 and random access memory ("RAM") 614. A basic input/output system ("BIOS") 616, which can form part of the ROM 612, contains basic routines that help transfer information between elements within the processor-based device 604, such as during start-up. Some embodiments may employ separate buses for data, instructions and power.

The processor-based device 604 may also include one or more solid state memories, for instance Flash memory or solid state drive (SSD) 618, which provides nonvolatile storage of computer-readable instructions, data structures, program modules and other data for the processor-based device 604. Although not depicted, the processor-based device 604 can employ other nontransitory computer- or processor-readable media, for example a hard disk drive, an optical disk drive, or memory card media drive.

Program modules can be stored in the system memory 608, such as an operating system 630, one or more application programs 632, other programs or modules 634, drivers 636 and program data 638.

The application programs 632 may, for example, include panning/scrolling 632a. Such panning/scrolling logic may include, but is not limited to logic that determines when and/or where a pointer (e.g., finger, stylus, cursor) enters a user interface element that includes a region having a central portion and at least one margin. Such panning/scrolling logic may include, but is not limited to logic that determines a direction and a rate at which at least one element of the user interface element should appear to move, and causes updating of a display to cause the at least one element to appear to move in the determined direction at the determined rate. The panning/scrolling logic 632a may, for example, be stored as one or more executable instructions. The panning/scrolling logic 632a may include processor and/or machine executable logic or instructions to generate user interface objects using data that characterizes movement of a pointer, for example data from a touch-sensitive display or from a computer mouse or trackball, or other user interface device.

The system memory 608 may also include communications programs 640, for example a server and/or a Web client or browser for permitting the processor-based device 604 to access and exchange data with other systems such as user computing systems, Web sites on the Internet, corporate intranets, or other networks as described below. The communications program 640 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 6 as being stored in the system memory 608, the operating system 630, application programs 632, other programs/modules 634, drivers 636, programs data 638 and server and/or browser 640 can be stored on any other of a large variety of non-transitory processor-readable media (e.g., hard disk drive, optical disk drive, SSD and/or flash memory).

A user can enter commands and information via a pointer, for example through input devices such as a touch screen 648 via a finger 644a, stylus 644b, or via a computer mouse or trackball 644c which controls a cursor. Other input devices can include a microphone, joystick, game pad, tablet, scanner, biometric scanning device, etc. These and other input devices (i.e., "I/O devices") are connected to the processor(s) 606 through an interface 646 such as a touch-screen controller and/or a universal serial bus ("USB") interface that couples user input to the system bus 610, although other interfaces such as a parallel port, a game port or a wireless interface or a serial port may be used. The touch screen 648 can be coupled to the system bus 610 via a video interface 650, such as a video adapter to receive image data or image information for display via the touch screen 648. Although not shown, the processor-based device 604 can include other output devices, such as speakers, vibrator, haptic actuator or haptic engine, etc.

The processor-based device 604 operates in a networked environment using one or more of the logical connections to communicate with one or more remote computers, servers and/or devices via one or more communications channels, for example, one or more networks 614a, 614b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based device 604 may include one or more network, wired or wireless communications interfaces 652a, 656 (e.g., network interface controllers, cellular radios, WI-FI radios, Bluetooth radios) for establishing communications over the network, for instance the Internet 614a or cellular network.

In a networked environment, program modules, application programs, or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, the processor(s) 606, system memory 608, and network and communications interfaces 652a, 656 are illustrated as communicably coupled to each other via the system bus 610, thereby providing connectivity between the above-described components. In alternative embodiments of the processor-based device 604, the above-described components may be communicably coupled in a different manner than illustrated in FIG. 6. For example, one or more of the above-described components may be directly coupled to other components, or may be coupled to each other, via intermediary components (not shown). In some embodiments, system bus 610 is omitted and the components are coupled directly to each other using suitable connections.

Figure 7:
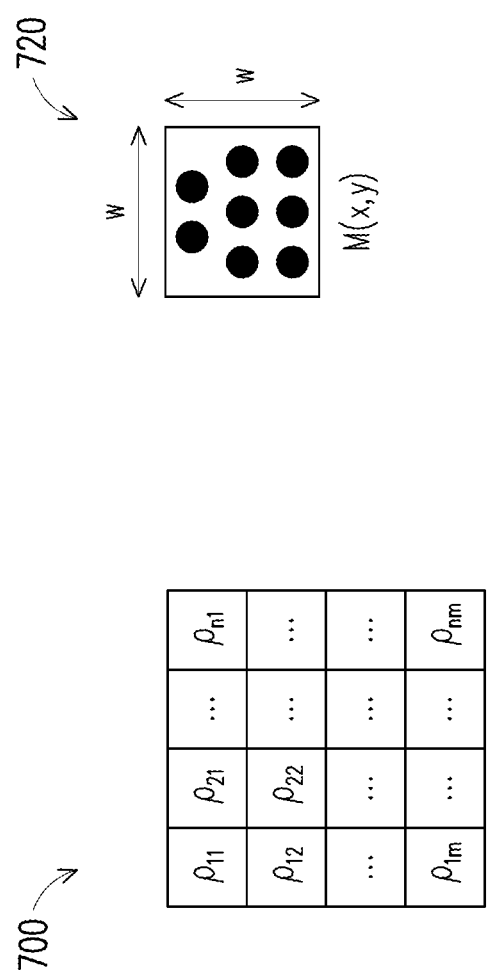
FIG. 7 is an example partition grid of a wafer surface.

FIG. 7 shows an example partition grid 700 of a wafer having n*m grid regions and an example mask pattern ("M") 720 for a grid region. Each of the n*m grid regions has a grid size of w.

Figure 8:
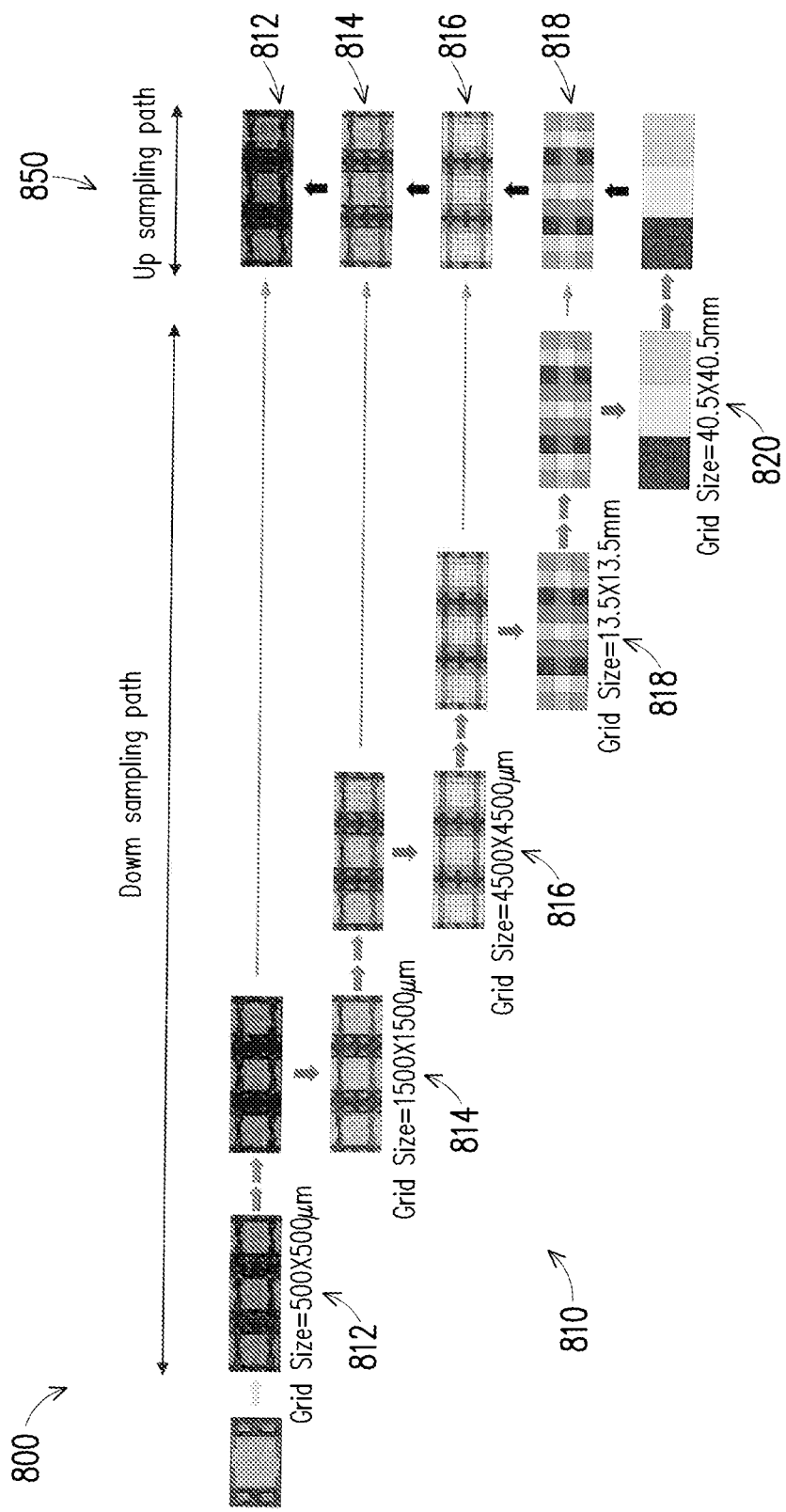
FIG. 8 is an example pattern density smoothing operation with down-sampling path and up-sampling path.

FIG. 8 shows an example pattern density smoothing operation 800 that includes a down-sampling path 810 and an up-sampling path 850 of pattern density smoothing.

The example pattern density smoothing operation 800 of FIG. 8 is described herein with reference also to FIG. 7. In the example pattern density smoothing, Gaussian smoothing is used as an example smoothing technique, which does not limit the scope of the disclosure. Other image smoothing techniques, like order statistic smoothing (mean, median), low pass Butterworth smoothing, can also be used for the pattern density smoothing at each level of partition grids.

FIG. 8 shows the pattern density smoothing operation on a single die as an illustrative example. Similar pattern density smoothing operations can be conducted on multiple dies symmetrically or can be conducted on a full wafer, e.g., a 300 mm wafer or a 450 mm wafer.

The operation 800 begins the down-sampling path 810. At a first grid level 812, the grid size w=500 µm. A grid region covers an area of 500 µm×500 µm. The initial pattern density ρ(x, y) of a grid region M(x, y) is determined using algorithms (1), (2) described herein. With the initial pattern density values for all the grid regions obtained, the local pattern density correction is calculated according to the below algorithms:

$$\rho^{n'} = K*(G*\rho^n), \quad (3)$$

$$G_{\sigma_n \times \sigma_n}(i, j) = \frac{1}{2\pi\sigma_n} e^{-\frac{(i-i_o)^2 + (j-j_o)^2}{2\sigma_n}}; i_o = j_o = \left\lceil \frac{\sigma_n}{2} \right\rceil, \quad (4)$$

$$K = f_1(\rho^n, \nabla\rho^n), \quad (5)$$

where ρ" denotes an initial pattern density value of a grid region M(x, y) at a grid level n where the down-sampling path starts; $\rho^{n'}$ denotes pattern density after local correction; K denotes gradient aware correction kernel; $\nabla\rho^n$ denotes 2D gradient of ρ"; $\sigma_n$ denotes a size of a cluster of $\sigma_n \times \sigma_n$ neighboring grid regions used in the local correction, e.g., $\sigma_n$=3 indicating 9 neighboring grid regions including the grid region M(x, y) are used in the local correction.

At a second grid level 814, the grid size is increased to w=1500 µm. A grid region covers an area of 1500 µm×1500 µm. Due to the increased size, a grid region of the second grid level 814 may include multiple grid regions of the first grid level 812. In an embodiment, the region size of the second grid level 814 is the same as the size of the cluster of neighboring grid regions used in the local correction operation of the first grid level 812. As such, a grid region of the second grid level 814 will contain 9 neighboring grid regions of the first grid level 812, i.e., $\sigma_n$=3. The initial pattern density of a grid region of the second grid level 814 is determined based on the corrected pattern density value of the grid regions of the first grid level 812 that are contained in the grid region of the second grid level 814. In an embodiment, the below algorithm is used to determine the initial pattern density value of a grid region of the second grid level 814:

$$\rho^{n+1}(x, y) = \frac{1}{\sigma_n^2} \sum_{(x', y') \in N(x,y)} \rho^{n'}(x', y'), \quad (6)$$

where $\rho^{n+1}$ (x,y) denotes an initial pattern density value of a grid region at a grid level n+1, ρ" (x', y') denotes a locally corrected pattern density value of a grid region of grid level n that is contained in the grid region at the grid level n+1, and N(x,y) corresponds to $\sigma_n \times \sigma_n$ of neighboring grid regions.

With the initial pattern density values for all the grid regions at the second grid level 814 being obtained using algorithm (6), the local pattern density correction is calculated for the second grid level 814 using the algorithms (3), (4) and (5).

After the local corrections are completed for the grid level 814, the down-sampling path proceeds to a third grid level 816, where the grid size is further increased to w=4500 µm, or three times the grid size of the second grid level 814, i.e., $\sigma_n$=3. Similar operations as those on the second grid level 814 are conducted on the third grid level 816 based on the locally corrected pattern density values of the second grid level 814.

The local correction operations are further conducted at each of the grid levels 818, 820 along the down-sampling path 810 until the grid size reaches a threshold, e.g., w=40.5 mm at the grid level 820. After the local correction operation is completed for the grid level 820, the up-sampling path 850 starts.

Along the up-sampling path 850, the grid size decreases in the sequence of grid level 820, 818, 816, 814 and 812. At each grid level, the pattern density of a grid region is determined based on the locally corrected pattern density of the down-sampling path 810 and a global correction factor. The global correction factor is determined based on the pattern density value of a grid region of a larger grid size w. In an embodiment, the following algorithm is used to determine a corrected pattern density value ρ"" in the up-sampling path 850:

$$\rho^{n''} = \rho^{n'} + f_2(\rho_l^n, \rho_u^n, \Delta_G^n) \quad (7),$$

where $\rho^{n'}$ denotes pattern density after local correction in the down-sampling path; $\rho_l^n$, $\rho_u^n$ denotes a lower pattern density limit and an upper pattern density limit; $\Delta_G^n$ denotes a global correction factor at grid level n due to the pattern density values of grid level n+1; and $f_2$ is a function of $\rho_l^n$, $\rho_u^n$, and $\Delta_G^n$.

The $\Delta_G^n$ may be determined using the below algorithm:

$$\Delta_G^n = \rho^{n+1'} - \rho^{n+1} \quad (8).$$

In an embodiment, one or more of the lower pattern density limit and the upper pattern density limit may be retrieved or determined based on rules stored in the rule engine 432.

The example operation 800 has the down-sampling path 810 conducted before the up-sampling path 850. As described herein, this sequential order emphasizes the influence of the local neighboring grid regions over the global influence. In a scenario where the global influence is more important than the local influence, a reversed sequential order between the down-sampling path 810 and the up-sampling path 850 may be followed.

Although not required, the implementations will be described in the general context of computer-executable instructions, such as program application modules, objects, or macros stored on computer- or processor-readable storage media and executed by a computer or processor. Those skilled in the relevant art will appreciate that the illustrated implementations as well as other implementations can be practiced with other system configurations and/or other computing system configurations, including hand-held devices, multiprocessor systems, microprocessor-based or programmable consumer electronics, personal computers (PCs), network PCs, mini computers, mainframe computers, and the like. The implementations can be practiced in distributed computing environments where tasks or modules are performed by remote processing devices, which are linked through a communications network 150 such as the Internet. In a distributed computing environment, program modules may be located in both local and remote memory storage devices.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally, regardless of the particular type of signal bearing media used to actually carry out the distribution. Examples of signal bearing media include, but are not limited to, the following: recordable type media such as floppy disks, hard disk drives, CD ROMs, digital tape, and computer memory The following disclosure provides many different embodiments, or examples, for implementing different features of the described subject matter. Specific examples of components and arrangements are described below to simplify the present description. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the following description, certain specific details are set forth in order to provide a thorough understanding of various embodiments of the disclosure. However, one skilled in the art will understand that the disclosure may be practiced without these specific details. In other instances, well-known structures associated with electronic components and fabrication techniques have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second and third does not necessarily imply a ranked sense of order, but rather may only distinguish between multiple instances of an act or structure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The present disclosure may be further appreciated with the description of the following embodiments.

In a method embodiment, a first layout data is received. The first layout data represents a plurality of features formed on a surface of a wafer. The surface includes a plurality of grid regions under a first partition level. An initial pattern density value is determined for each of the plurality of grid regions under the first partition level. A planned pattern density value of a first grid region of the plurality of grid regions is obtained by adjusting an initial pattern density value of the first grid region based on an initial pattern density value of a second grid region of the plurality of grid regions under the first partition level. A second layout data of the first grid region is determined based on the planned pattern density value. The plurality of features are formed on the surface of the wafer based at least in part on the second layout data of the first grid region.

In a system embodiment, a system includes a wafer processing tool configured to form a plurality of connection features on a wafer surface, a database configured to store a design data of the plurality of connection features, and a processor-based controller operable to control the wafer processing tool to form the plurality of connection features on the wafer surface. The processor-based controller is operable to perform actions including partitioning the wafer surface into a first plurality of grid regions under a first partition level; determining a first pattern density value for a first grid region of the first plurality of grid regions; adjusting the first pattern density value of the first grid region based on a second pattern density value of a second grid region of the first plurality of grid regions; determining a layout data of the first grid region based on the adjusted first pattern density value of the first grid region; and controlling the wafer processing tool to form the plurality of connection features on the surface of the wafer based at least in part on the layout data of the first grid region.

In another method embodiment, a first layout data is received. The first layout data indicates a plurality of discrete conductive structures formed on a surface of a first substrate. The plurality of discrete conductive structures include a first discrete conductive structure formed in a first region on the surface. A pattern density value of the first region is determined. A height value of the first discrete conductive structure is determined. The pattern density value of the first region is adjusted based on the height value of the first discrete conductive structure. A layout of the first grid region is determined based on the adjusted pattern density value. The plurality of discrete conductive structures are formed on the surface based at least in part on the layout of the first grid region.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving a first layout data of a plurality of features to be formed on a surface of a wafer, the surface including a plurality of grid regions under a first grid level;
   determining an initial pattern density value for each of the plurality of grid regions under the first grid level;
   obtaining a planned pattern density value of a first grid region of the plurality of grid regions by adjusting an initial pattern density value of the first grid region based on an initial pattern density value of a second grid region of the plurality of grid regions under the first grid level;
   determining a second layout data of the first grid region based on the planned pattern density value; and
   forming the plurality of features on the surface of the wafer based at least in part on the second layout data of the first grid region.

2. The method of claim 1, wherein the initial pattern density value is determined based on the first layout data.

3. The method of claim 2, wherein the initial pattern density value is determined based on the first layout data with respect to the first grid region and a peripheral area adjacent to the first grid region.

4. The method of claim 1, wherein the initial pattern density value is determined based on a pattern density value of a third grid region under a second grid level, and the third grid region overlaps with the first grid region.

5. The method of claim 4, the third grid region contains the first grid region.

6. The method of claim 4, wherein the third grid region is contained in the first grid region.

7. The method of claim 1, wherein the determining the second layout data of the first grid region based on the planned pattern density value includes determining a surface area of a feature in the first grid region.

8. The method of claim 1, wherein the obtaining the planned pattern density value of the first grid region of the plurality of grid regions further includes adding a feature into the first grid region.

9. The method of claim 8, wherein the obtaining the planned pattern density value of the first grid region of the plurality of grid regions further includes removing a feature from the first grid region.

10. The method of claim 1, wherein the adjusting the initial pattern density value of the first grid region based on the initial pattern density value of the second grid region includes a Gaussian smoothing calculation.

11. The method of claim 10, wherein the Gaussian smoothing calculation uses a gradient aware correction kernel.

12. A system, comprising:
   a wafer processing tool configured to form a plurality of connection features on a wafer surface;
   a database configured to store a design data of the plurality of connection features; and
   a processor-based controller operable to control the wafer processing tool to form the plurality of connection features on the wafer surface and configured to:
      partition layout data of the wafer surface into a first plurality of grid regions under a first grid level;
      determine a first pattern density value for a first grid region of the first plurality of grid regions;
      adjust the first pattern density value of the first grid region based on a second pattern density value of a second grid region of the first plurality of grid regions;
      generate adjusted layout data of the first grid region based on the adjusted first pattern density value of the first grid region; and
      control the wafer processing tool to form the plurality of connection features on the surface of the wafer based at least in part on the adjusted layout data of the first grid region.

13. The system of claim 12, wherein the processor based-controller is further configured to:
   partition the layout data of the wafer surface into a second plurality of grid regions under a second grid level;
   determine a third pattern density value for a third grid region of the second plurality of grid regions; and
   adjust the third pattern density value of the third grid region based on a fourth pattern density value of a fourth grid region of the second plurality of grid regions.

14. The system of claim 13, wherein the third grid region contains the first grid region, and the third pattern density value of the third grid region is determined based on the adjusted first pattern density value.

15. The system of claim 13, wherein the third grid region contains the first grid region, and further comprising adjusting the first pattern density value of the first grid region based on the adjusted third pattern density value of the third grid region.

16. A method, comprising:
- receiving a first layout data of a plurality of discrete conductive structures to be formed on a surface of a first substrate, the plurality of discrete conductive structures including a first discrete conductive structure formed in a first grid region on the surface;
- determining a pattern density value of the first grid region;
- determining a height value of the first discrete conductive structure;
- adjusting the pattern density value of the first grid region based on the height value of the first discrete conductive structure;
- determining a layout of the first grid region based on the adjusted pattern density value; and
- forming the plurality of discrete conductive structures on the surface based at least in part on the layout of the first grid region, wherein the pattern density value is determined based on the first layout data with respect to the first grid region and a peripheral area adjacent to the first grid region.

17. The method of claim 16, wherein the height value of the first discrete conductive structure is a relative height value with respect to another one of the plurality of discrete conductive structures.

18. The method of claim 16, wherein the height value is determined based on a surface layout of a second substrate configured to couple to the first substrate through the surface of the first substrate.

19. The method of claim 16, wherein the pattern density value of the first grid region is determined based on the first layout data.

* * * * *